US009244751B2

(12) United States Patent
Cherkasova et al.

(10) Patent No.: US 9,244,751 B2
(45) Date of Patent: Jan. 26, 2016

(54) ESTIMATING A PERFORMANCE PARAMETER OF A JOB HAVING MAP AND REDUCE TASKS AFTER A FAILURE

(75) Inventors: Ludmila Cherkasova, Sunnyvale, CA (US); Abhishek Verma, Champaign, IL (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 152 days.

(21) Appl. No.: 14/118,520

(22) PCT Filed: May 31, 2011

(86) PCT No.: PCT/US2011/038495
§ 371 (c)(1),
(2), (4) Date: Nov. 18, 2013

(87) PCT Pub. No.: WO2012/166106
PCT Pub. Date: Dec. 6, 2012

(65) Prior Publication Data
US 2014/0089727 A1    Mar. 27, 2014

(51) Int. Cl.
*G06F 11/00* (2006.01)
*G06F 11/07* (2006.01)
*G06F 11/34* (2006.01)
*G06F 11/20* (2006.01)

(52) U.S. Cl.
CPC ........ *G06F 11/0715* (2013.01); *G06F 11/3404* (2013.01); *G06F 11/3447* (2013.01); *G06F 11/2041* (2013.01); *G06F 11/3419* (2013.01); *G06F 11/3433* (2013.01); *G06F 2201/865* (2013.01)

(58) Field of Classification Search
CPC .................................................. G06F 11/0715
See application file for complete search history.

(56) References Cited

U.S. PATENT DOCUMENTS

| 7,418,470 | B2 | 8/2008 | Howard |
| 7,516,360 | B2 | 4/2009 | Bacher |
| 7,640,547 | B2 | 12/2009 | Neiman |
| 7,657,501 | B1 | 2/2010 | Brown et al. |

(Continued)

FOREIGN PATENT DOCUMENTS

| WO | WO-2006/050349 | 5/2006 |
| WO | WO-2012105969 | 8/2012 |

(Continued)

OTHER PUBLICATIONS

Do et al., Failure-aware Scheduling in Grid Computing Environments, GCA '09 Conference—2009 (7 pages).

(Continued)

*Primary Examiner* — Christopher McCarthy
(74) *Attorney, Agent, or Firm* — Trop, Pruner & Hu, P.C.

(57) ABSTRACT

A job profile includes characteristics of a job to be executed, where the characteristics of the job profile relate to map tasks and reduce tasks of the job, and where the map tasks produce intermediate results based on input data, and the reduce tasks produce an output based on the intermediate results. In response to a failure in a system, numbers of failed map tasks and reduce tasks of the job based on a time of the failure are computed, and numbers of remaining map tasks and reduce tasks are computed. A performance model is provided, and a performance parameter of the job is estimated using the performance model.

16 Claims, 4 Drawing Sheets

(56) References Cited

U.S. PATENT DOCUMENTS

| | | | |
|---|---|---|---|
| 8,510,538 | B1 | 8/2013 | Malewicz et al. |
| 8,560,779 | B2 | 10/2013 | Castillo et al. |
| 8,682,812 | B1 | 3/2014 | Ranjan |
| 8,732,720 | B2 * | 5/2014 | Verma et al. ............... 718/106 |
| 8,799,916 | B2 | 8/2014 | Cherkasova |
| 8,924,977 | B2 * | 12/2014 | Meng et al. ............... 718/102 |
| 2004/0230397 | A1 | 11/2004 | Chadwick |
| 2007/0046664 | A1 | 3/2007 | Raspl et al. |
| 2008/0086442 | A1 | 4/2008 | Dasdan |
| 2009/0241117 | A1 | 9/2009 | Dasgupta et al. |
| 2009/0313635 | A1 | 12/2009 | Dasdan |
| 2009/0327012 | A1 | 12/2009 | Sharma et al. |
| 2009/0327854 | A1 | 12/2009 | Chhajer et al. |
| 2010/0005080 | A1 | 1/2010 | Pike et al. |
| 2010/0205075 | A1 | 8/2010 | Zhang |
| 2010/0241828 | A1 | 9/2010 | Yu et al. |
| 2010/0262695 | A1 | 10/2010 | Mays |
| 2010/0281078 | A1 | 11/2010 | Wang |
| 2010/0281166 | A1 | 11/2010 | Buyya et al. |
| 2011/0055287 | A1 | 3/2011 | Sun et al. |
| 2011/0066649 | A1 * | 3/2011 | Berlyant et al. ............ 707/770 |
| 2011/0093852 | A1 | 4/2011 | Li |
| 2011/0154350 | A1 | 6/2011 | Doyle |
| 2011/0161636 | A1 | 6/2011 | Chung et al. |
| 2011/0225584 | A1 | 9/2011 | Andrade et al. |
| 2011/0276962 | A1 | 11/2011 | Chambers et al. |
| 2011/0292056 | A1 | 12/2011 | Haas et al. |
| 2011/0302226 | A1 | 12/2011 | Abadi et al. |
| 2011/0307899 | A1 | 12/2011 | Lee et al. |
| 2013/0054809 | A1 | 2/2013 | Urmanov et al. |
| 2013/0104140 | A1 | 4/2013 | Meng et al. |
| 2013/0117752 | A1 | 5/2013 | Li et al. |
| 2013/0219068 | A1 | 8/2013 | Ballani et al. |
| 2013/0254196 | A1 | 9/2013 | Babu et al. |
| 2013/0268941 | A1 | 10/2013 | Cherkasova et al. |
| 2013/0318538 | A1 * | 11/2013 | Verma et al. ............... 718/104 |
| 2013/0332931 | A1 * | 12/2013 | Malewicz et al. ............ 718/102 |
| 2013/0339972 | A1 | 12/2013 | Zhang et al. |
| 2014/0026147 | A1 | 1/2014 | Cherkasova |
| 2014/0032528 | A1 | 1/2014 | Mandre |
| 2014/0215471 | A1 | 7/2014 | Cherkasova |

FOREIGN PATENT DOCUMENTS

| | | |
|---|---|---|
| WO | WO-2012144985 | 10/2012 |
| WO | WO-2012154177 | 11/2012 |

OTHER PUBLICATIONS

PCT Search Report/Written Opinion—Application No. PCT/US2011/038495 dated Feb. 28, 2012—9 pages.
Wang et al., A Simulation Approach to Evaluating Design Decisions in MapReduce Setups, Sep. 2009 (11 pages).
Abhishek Verma et al., ARIA: Automatic Resource Inference and Allocation for MapReduce Environments, HP Laboratories, HPL-2011-58, May 2011 (11 pages).
Abhishek Verma et al., Play It Again, SimMR, HP Laboratories, HPL-2011-127, Aug. 2011 (10 pages).
Aboulnaga. A.. et al, Packing the most onto your cloud, IN: the first international workshop on Cloud data management, ACM New York. NY, USA, 2009 (4 pages).
Ahmad et al., Tarazu: Optimizing MapReduce on Heterogeneous Clusters, ASPLOS'12—Mar. 2012 (14 pages).
Ananthanarayanan et al., Technical Report MSR-TR-2010-69, Reining in the Outliers in Map-Reduce Clusters using Mantri, Jun. 2010 (24 pages).
Ashish Thusoo et al., Data Warehousing and Analytics Infrastructure at Facebook, SIGMOD 2010, Jun. 6-10, 2010 (8 pages).
Aster Data, Datasheet, Aster Data Advanced In-Database Analytics, 2009 (2 pages).
Chaiken et al., SCOPE: Easy and Efficient Parallel Processing of Massive Data Sets, Aug. 2008 (12 pages).

Chen et al, "INTEL, Map-Reduce Meets Wider Varieties of Applications" IRP-TR-08-05, 2008, (8 pages).
Dean et al., MapReduce: Simplified Data Processing on Large Clusters, Google, Inc., OSDI 2004 (13 pages).
Dianne P. O'Leary, Robust Regression Computation Using Iteratively Reweighted Least Squares, 1990 Society for Industrial and Applied Mathematics, vol. 11, No. 3, Jul. 1990, pp. 466-480.
Driscoll et al., Abstract only—Accurate Predictions of Parallel Program Execution Time, Portland State University, 2002 (1 page).
Fengguang Tian et al., Towards Optimal Resource Provisioning for Running MapReduce Programs in Public Clouds, 2011 (8 pages).
Fengguang Tian, Towards Optimal Resource Provisioning for Running MapReduce Programs in Public Clouds, A thesis submitted in partial fulfillment of the requirements for the degree of Master of Science, Nov. 2011 (49 pages).
Ganapathi et al., Statistics-Driven Workload Modeling for the Cloud, Technical Report No. UCB/EECS-2009-160, Nov. 2009 (8 pages).
Gates et al., Building a HighLevel Dataflow System on top of MapReduce: The Pig Experience, Aug. 2009 (12 pages).
Guanying Wang, Evaluating MapReduce System Performance: A Simulation Approach, Aug. 2012 (107 pages).
Herodotou et al., Profiling, What-if Analysis, and Cost-based Optimization of MapReduce Programs, Sep. 2011 (12 pages).
Herodotou et al., Starfish: A Selftuning System for Big Data Analytics, Jan. 2011 (12 pages).
Herodotou, H. et al., No One (cluster) Size Fits All automatic Cluster Sizing for Data-intensive Analytics, Jun. 6, 2011 (12 pages).
Isard et al., Dryad: Distributed Data-Parallel Programs from Sequential Building Blocks, Mar. 2007 (14 pages).
Iverson et al., Statistical Prediction of Task Execution Times Through Analytic Benchmarking for Scheduling in a Heterogeneous Environment, 1999 (13 pages).
J.R. Quinlan, Learning with Continuous Classes, World Scientific, 1992 (6 pages).
Jeffrey Dean and Sanjay Ghemawat, MapReduce: Simplified Data Processing on Large Clusters, 2004 (13 pages).
Johnson, S.M., Optimal Two and Three-stage Production Schedules with Setup Times Included, May 1953 (18 pages).
Kambatla et al., Towards Optimizing Hadoop Provisioning in the Cloud, 2009 (5 pages).
Konwinski, Andrew, Improving MapReduce Performance in Heterogeneous Environments, Technical Report No. UCB/EECS-2009-183, Dec. 17, 2009 (40 pages).
McVoy et al., UseNix, Imbench: Portable Tools for Performance Analysis, Jan. 1996 (17 pages).
Mesnier, Michael P., On modeling the relative fitness of storage (data appendices), Dissertation, Nov. 27, 2007 (280 pages).
Morton et al., Estimating the Progress of MapReduce Pipelines, 2010 (4 pages).
Morton et al., ParaTimer: a Progress Indicator for Map Reduce DAGs, Jun. 2010 (12 pages).
Murphy, www.development.yahoo.com/blogs—Next Generation of Apache Hadoop MapReduce—Mar. 2011 (5 pages).
Murthy, A.C., "Next Generation of Apache Hadoop MapReduce—The Scheduler", Mar. 2011 (7 pages).
Olston et al., Pig Latin: A Not-So-Foreign Language for Data Processing, Jun. 2008 (12 pages).
Phan et al., Real-time MapReduce Scheduling, University of Pennsylvania, 2010 (6 pages).
Polo et al., Adaptive Task Scheduling for MultiJob MapReduce Environments, Proceedings of the 12th IEEE/IFIP Network Operations and Management Symposium, 2010 (8 pages).
Polo et al., Performance-Driven Task Co-Scheduling for MapReduce Environments, Apr. 2010 (8 pages).
Polo, J. et al., Performance Management of Mapreduce Applications, Sep. 2009 (94 pages).
Polo, Jorda et al., "Resource-aware adaptive scheduling for mapreduce clusters," Middleware 2011, Springer Berlin Heidelberg, 2011, 187-207.
Ranger, C.. et al Evaluating MapReduce for multi-core and multiprocessor systems, Evaluating mapreduce for multi-core and multipro-

(56) References Cited

OTHER PUBLICATIONS cessor systems. IN: proceedings of 13th International Symposium on High-Performance Computer Arc tetecture (HPCA), 2007 (12 pages).
Seltzer, et al., The Case for Application-Specific Benchmarking, www.eecs.harvard.edu, 1999 (5 pages).
Shoukat Ali et al., Task Execution Time Modeling for Heterogeneous Computing Systems, 0-7695-0556-2, 2000 IEEE (15 pages).
Sun et al, Scalable RDF Store Based on HBase and Map Reduce, 3rd Int'l Conf on Adv. Computer Theory and Engineering, 2010, (4 pages).
Thusoo et al., Hive—A Warehousing Solution Over a Map-Reduce Framework, Aug. 2009 (4 pages).
Timothy Wood et al., Profiling and Modeling Resource Usage of Virtualized Applications, 2008 (20 pages).
U.S. Appl. No. 13/525,820, Final Rejection dated Feb. 26, 2015, pp. 1-15 and attachment.
U.S. Appl. No. 13/525,820, Non-Final Rejection dated Jul. 6, 2015, pp. 1-19 and attachments.
U.S. Appl. No. 13/525,820, Non-Final Rejection dated Sep. 11, 2014, pp. 1-13 and attachments.
Verma et al., ARIA: Automatic Resource Inference and Allocation for MapReduce Environments, May 2011 (11 pages).
Wang et al., CoScan: Cooperative Scan Sharing in the Cloud, Oct. 2011 (12 pages).
Wang et al., Using Realistic Simulation for Performance Analysis of MapReduce Setups, ACM 978-1-60558-592, Jun. 10, 2009 (8 pages).
Yang, H. et al., Statistics-based Workload Modeling for Mapreduce, May 21-25, 2012 (9 pages).
Yoo et al, Phoenix Rebirth: Scalable Map Reduce on a Large-Scale Shared-Memory System, 2009, IEEE, (10 pages).
Zhang et al., Abstract only—Predicting Running Time of Grid Tasks based on CPU Load Predictions, 2006 7th IEEE/ACM International Conference on Grid Computing (1 page).
Zhang et al., Optimizing Completion Time and Resource Provisioning of Pig Programs, May 2012 (6 pages).
Zhang et al., Performance Implications of Failures in Large-Scale Cluster Scheduling, 2004 (17 pages).

* cited by examiner

ESTIMATING A PERFORMANCE PARAMETER OF A JOB HAVING MAP AND REDUCE TASKS AFTER A FAILURE

CROSS-REFERENCE TO RELATED APPLICATION

This application is a national stage application under 35 U.S.C. §371 of PCT/US2011/038495, filed May 31, 2011.

BACKGROUND

Many enterprises (such as companies, educational organizations, and government agencies) employ relatively large volumes of data that are often subject to analysis. A substantial amount of the data of an enterprise can be unstructured data, which is data that is not in the format used in typical commercial databases. Existing infrastructures may not be able to efficiently handle the processing of relatively large volumes of unstructured data.

BRIEF DESCRIPTION OF THE DRAWINGS

Some embodiments are described with respect to the following figures.

DETAILED DESCRIPTION

Figure 1:
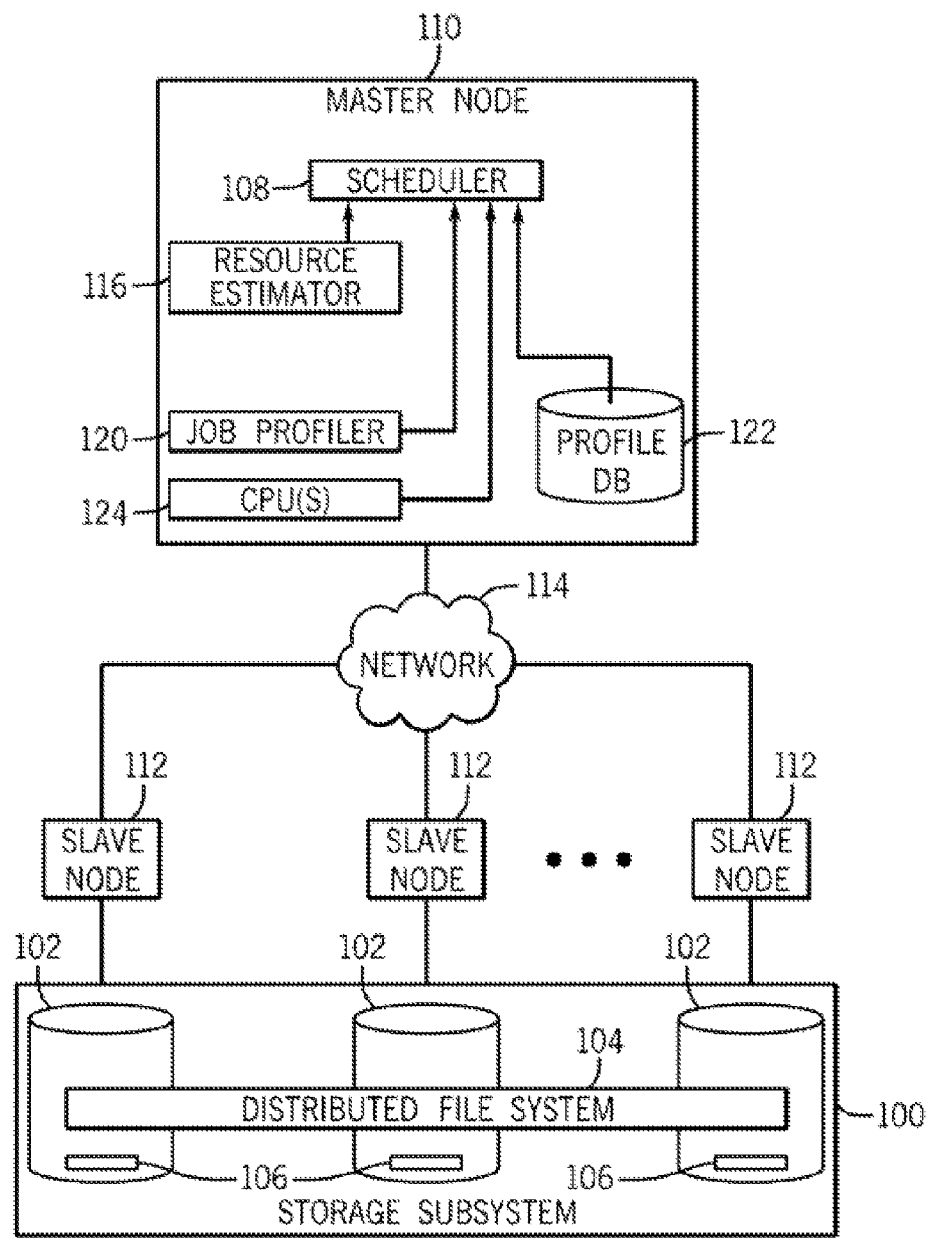
FIG. 1 is a block diagram of an example arrangement that incorporates some implementations.

For processing relatively large volumes of unstructured data, a MapReduce framework that provides a distributed computing platform can be employed. Unstructured data refers to data not formatted according to a format of a relational database management system. An open-source implementation of the MapReduce framework is Hadoop. The MapReduce framework is increasingly being used across enterprises for distributed, advanced data analytics and for enabling new applications associated with data retention, regulatory compliance, e-discovery, and litigation issues. The infrastructure associated with the MapReduce framework can be shared by various diverse applications, for enhanced efficiency.

Generally, a MapReduce framework includes a master computing node (or more simply, "master node") and multiple slave computing nodes (or more simply, "slave nodes" or "worker nodes"). A MapReduce job submitted to the master node is divided into multiple map tasks and multiple reduce tasks, which are executed in parallel by the slave nodes. The map tasks are defined by a map function, while the reduce tasks are defined by a reduce function. Each of the map and reduce functions are user-defined functions that are programmable to perform target functionalities.

The map function processes segments of input data to produce intermediate results, where each of the multiple map tasks (that are based on the map function) process corresponding segments of the input data. For example, the map tasks process input key-value pairs to generate a set of intermediate key-value pairs. The reduce tasks (based on the reduce function) produce an output from the intermediate results. For example, the reduce tasks merge the intermediate values associated with the same intermediate key.

More specifically, the map function takes input key-value pairs ($k_1$, $v_1$) and produces a list of intermediate key-value pairs ($k_2$, $v_2$). The intermediate values associated with the same key $k_2$ are grouped together and then passed to the reduce function. The reduce function takes an intermediate key $k_2$ with a list of values and processes them to form a new list of values ($v_3$), as expressed below.

$$\mathrm{map}(k_1,v_1) \rightarrow \mathrm{list}(k_2,v_2)$$

$$\mathrm{reduce}(k_2,\mathrm{list}(v_2)) \rightarrow \mathrm{list}(v_3)$$

The multiple map tasks and multiple reduce tasks (of multiple jobs) are designed to be executed in parallel across resources of a distributed computing platform.

To properly manage execution of jobs including map tasks and reduce tasks, performance parameters of respective jobs can be estimated. Performance parameters refer to parameters that represent execution attributes of a job during execution of the job. For example, a performance parameter can relate to an execution time duration of the job.

The performance parameters computed for respective jobs can depend on whether or not failures occur in a system. A type of failure that can occur is failure of a slave node on which map tasks and reduce tasks are executing. Failure of a slave node (or even multiple slave nodes) results in at least the following issues: (1) tasks that are being executed fail and the results produced during execution of these failed tasks may no longer be available; and (2) the amount of resources that can be used for remaining map and reduce tasks can be reduced. Note, however, that it may be possible to replenish resources lost due to failure of a slave node (or slave nodes) by using spare resources in place of the resources of the failed slave node(s). If replenishment can be performed, then the amount of resources that can be used for executing remaining map and reduce tasks can remain unchanged from an initial allocation.

Instead of an entire slave node failing, some portion of the slave node can fail in other examples. There can also be other types of failures in a system executing map and reduce tasks. As examples, code containing bugs or runtime exceptions can cause map and/or reduce tasks to fail. Another type of failure involves failure of a storage device such as a disk drive. In some examples, failure of a disk drive may have a relatively low impact on performance in executing the map and reduce tasks, since a MapReduce system usually replicates data across multiple storage devices such that even if one storage device were to fail, the data can be retrieved from a different storage device. The impact of a failed storage device can be the delay caused by having to retrieve the data of a failed storage device from another storage device. Additionally or alternatively, data on a failed storage device may be reconstructed if redundancy schemes such as RAID (Redundant Array of Independent Disks) are implemented.

In the ensuing discussion, the failure assumed is failure of a slave node (or multiple slave nodes). However, ascertaining impact of failure can be applied for other types of failures in other implementations.

Although reference is made to the MapReduce framework in some examples, it is noted that techniques or mechanisms according to some implementations can be applied in other distributed processing frameworks that employ map tasks and reduce tasks. More generally, "map tasks" are used to process input data to output intermediate results, based on a predefined function that defines the processing to be performed by the map tasks. "Reduce tasks" take as input partitions of the intermediate results to produce outputs, based on a predefined function that defines the processing to be performed by the reduce tasks. The map tasks are considered to be part of a map stage, whereas the reduce tasks are considered to be part of a reduce stage. In addition, although reference is made to unstructured data in some examples, techniques or mechanisms according to some implementations can also be applied to structured data formatted for relational database management systems.

FIG. 1 illustrates an example arrangement that provides a distributed processing framework that includes mechanisms according to some implementations. As depicted in FIG. 1, a storage subsystem 100 includes multiple storage modules 102, where the multiple storage modules 102 can provide a distributed file system 104. The distributed file system 104 stores multiple segments 106 of input data across the multiple storage modules 102. The distributed file system 104 can also store outputs of map and reduce tasks.

The storage modules 102 can be implemented with storage devices such as disk-based storage devices or integrated circuit storage devices. In some examples, the storage modules 102 correspond to respective different physical storage devices. In other examples, plural ones of the storage modules 102 can be implemented on one physical storage device, where the plural storage modules correspond to different logical partitions of the storage device.

The system of FIG. 1 further includes a master node 110 that is connected to slave nodes 112 over a network 114. The network 114 can be a private network (e.g., a local area network or wide area network) or a public network (e.g., the Internet), or some combination thereof. The master node 110 includes one or multiple central processing units (CPUs) 124. Each slave node 112 also includes one or multiple CPUs (not shown). Although the master node 110 is depicted as being separate from the slave nodes 112, it is noted that in alternative examples, the master node 112 can be one of the slave nodes 112.

A "node" refers generally to processing infrastructure to perform computing operations. A node can refer to a computer, or a system having multiple computers. Alternatively, a node can refer to a CPU within a computer. As yet another example, a node can refer to a processing core within a CPU that has multiple processing cores. More generally, the system can be considered to have multiple processors, where each processor can be a computer, a system having multiple computers, a CPU, a core of a CPU, or some other physical processing partition.

In accordance with some examples, a scheduler 108 in the master node 110 is configured to perform scheduling of jobs on the slave nodes 112. The slave nodes 112 are considered the working nodes within the duster that makes up the distributed processing environment.

Each slave node 112 has a corresponding number of map slots and reduce slots, where map tasks are run in respective map slots, and reduce tasks are run in respective reduce slots. The number of map slots and reduce slots within each slave node 112 can be preconfigured, such as by an administrator or by some other mechanism. The available map slots and reduce slots can be allocated to the jobs. The map slots and reduce slots are considered the resources used for performing map and reduce tasks. A "slot" can refer to a time slot or alternatively, to some other share of a processing resource that can be used for performing the respective map or reduce task. Depending upon the load of the overall system, the number of map slots and number of reduce slots that can be allocated to any given job can vary.

The slave nodes 112 can periodically (or repeatedly) send messages to the master node 110 to report the number of free slots and the progress of the tasks that are currently running in the corresponding slave nodes.

Each map task processes a logical segment of the input data that generally resides on a distributed file system, such as the distributed file system 104 shown in FIG. 1. The map task applies the map function on each data segment and buffers the resulting intermediate data. This intermediate data is partitioned for input to the reduce tasks.

The reduce stage (that includes the reduce tasks) has three phases: shuffle phase, sort phase, and reduce phase. In the shuffle phase, the reduce tasks fetch the intermediate data from the map tasks. In the sort phase, the intermediate data from the map tasks are sorted. An external merge sort is used in case the intermediate data does not fit in memory. Finally, in the reduce phase, the sorted intermediate data (in the form of a key and all its corresponding values, for example) is passed on the reduce function. The output from the reduce function is usually written back to the distributed file system 104.

In addition to the scheduler 108, the master node 110 of FIG. 1 includes a job profiler 120 that is able to create a job profile for a given job, in accordance with some implementations. As discussed above, the job profile describes characteristics of map and reduce tasks of the given job to be performed by the system of FIG. 1. A job profile created by the job profiler 120 can be stored in a job profile database 122. The job profile database 122 can store multiple job profiles, including job profiles of jobs that have executed in the past.

The master node 110 also includes a resource estimator 116 that is able to allocate resources, such as numbers of map slots and reduce slots, to a job, given a performance goal (e.g. target completion time) associated with the job. The resource estimator 116 receives as input a job profile, which can be a job profile created by the job profiler 120, or a job profile previously stored in the job profile database 122. The resource estimator 116 also uses a performance model that calculates a performance parameter (e.g. time duration of the job) based on the characteristics of the job profile, a number of map tasks of the job, a number of reduce tasks of the job, and an allocation of resources (e.g., number of map slots and number of reduce slots).

Using the performance parameter calculated by the performance model, the resource estimator 116 is able to determine feasible allocations of resources to assign to the given job to meet the performance goal associated with the given job. The performance goal is expressed as a target completion time, which can be a target deadline or a target time duration, by or within which the job is to be completed. In such implementations, the performance parameter that is calculated by the performance model is a time duration value corresponding to the amount of time the job would take assuming a given allocation of resources. The resource estimator 116 is able to determine whether any particular allocation of resources can meet the performance goal associated with a job by comparing a value of the performance parameter calculated by the performance model to the performance goal.

Other performance goals can be used in other examples. For example, a performance goal can be expressed as a service level objective (SLO), which specifies a level of service to be provided (expected performance, expected time, expected cost, etc.).

As shown in FIG. 1, the scheduler 108 receives the following inputs: job profiles from the job profiler 120 and/or profile database 122, and a specific allocation of resources from the resource estimator 116. Given the inputs received by the scheduler 108, the scheduler 108 is able to schedule the jobs for execution on available resources of the system, where the resources refer to map slots and reduce slots in respective slave nodes 112.

Figure 2:
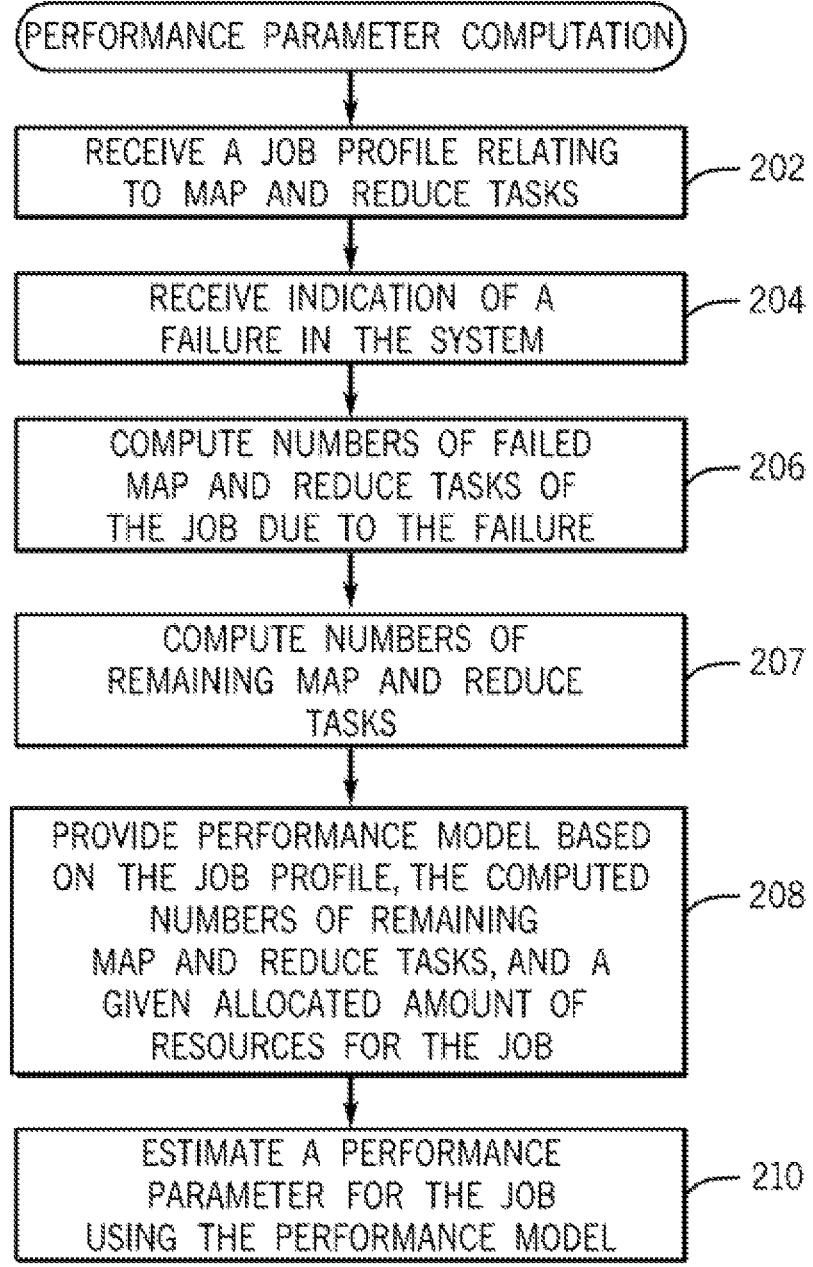
FIG. 2 is a flow diagram of a process of determining a performance parameter according to some implementations.

FIG. 2 is a flow diagram of a process of estimating a performance parameter (such as a time parameter) of a job. The process of FIG. 2 can be performed by the scheduler 108 of FIG. 1, for example. The process receives (at 202) a job profile that includes characteristics of the job to be executed, where the characteristics of the job profile relate to map tasks and reduce tasks of the job.

The process receives (at 204) an indication of a failure in the system associated with execution of the job. As an example, the indication can include a time indication indicating when the failure occurred, and the indication can further specify the specific failure that occurred, which can be failure of a slave node (or multiple slave nodes), or some other type of failure. The time of failure can be measured relative to a start time of the job.

The process computes (at 206) numbers of failed map tasks and reduce tasks of the job based on the time of the failure. For example, if the failure includes a failed slave node or multiple slave nodes, then the number of failed map tasks and reduce tasks resulting from the failed slave node(s) can be determined. The numbers of failed map tasks and reduce tasks depend on when the failure occurred. If the failure occurred during a map stage, then there will be some non-zero number of failed map tasks, but there would be zero failed reduce tasks.

However, if the failure occurred during the reduce stage, then there would be some non-zero number of failed reduce tasks, and the number of failed map tasks would be all map tasks of the failed slave node(s) in the map stage. When a failure occurs during the reduce stage, all of the completed map tasks that reside on the failed slave node(s) as well as the reduce tasks that were in-progress on the failed slave node(s) would have to be re-executed.

An estimated performance parameter for a job thus depends on the timing of the failure. In addition, the estimated performance parameter also depends on whether replenishment of resources has been or is to be performed. For example, if a slave node failure occurs in the beginning of the map stage, and the resources of the failed slave node are immediately replenished with additional resources, then the performance parameter of the job may remain generally the same, or is modified just slightly. However, if the failed resources are not replenished, then the estimated performance parameter would change substantially (e.g. if the performance parameter is a time parameter, then the execution time will increase as a result of failure to replenish failed resources).

On the other hand, if failure of the slave node occurred during the job's last phases of the reduce stage, then all of the completed map tasks that reside on the failed slave node as well as the reduce tasks that are in-progress on the failed slave node would have to be re-executed. Thus, even if the resources of the failed slave node were immediately replenished, the performance parameter due to the failure occurring in the later phases of the reduce stage would still be significantly affected.

The process of FIG. 2 then computes (at 207) numbers of remaining map tasks and remaining reduce tasks based on the numbers of failed map tasks and failed reduce tasks computed at 206. The process provides (at 208) a performance model based on the job profile, the computed numbers of remaining map tasks and reduce tasks, and an allocated amount of resources for the job. The allocated amount of resources for the job can include an initial allocation of resources less the resources of the failed slave node(s), assuming that replenishment is not performed. However, if replenishment is performed, then the allocated amount of resources for the job remains unchanged from the initial allocation of resources.

The process of FIG. 2 then estimates (at 210) a performance parameter of the job using the performance model. Details regarding estimation of a performance parameter based on a performance model are discussed further below.

Figure 3A:
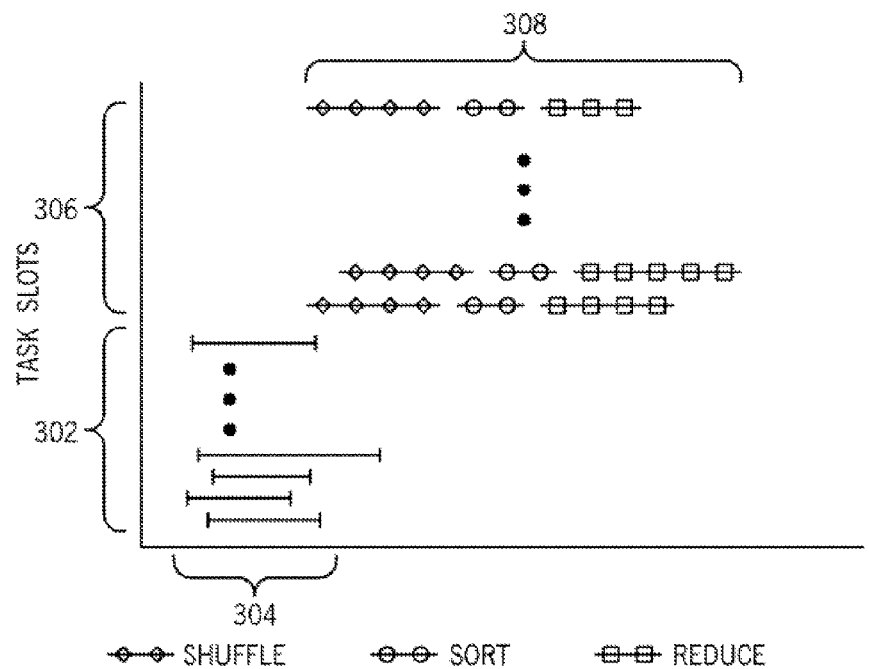
FIGS. 3A-3B are graphs illustrating map tasks and reduce tasks of a job in a MapReduce environment, according to some examples.
Figure 3B:
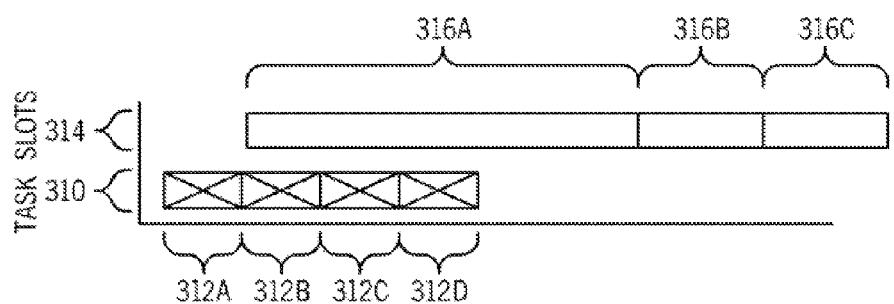

FIGS. 3A and 3B illustrate differences in completion times of performing map and reduce tasks of a given job due to different allocations of map slots and reduce slots. FIG. 3A illustrates an example in which there are 64 map slots and 64 reduce slots allocated to the given job. The example also assumes that the total input data to be processed for the given job can be separated into 64 partitions. Since each partition is processed by a corresponding different map task, the given job includes 64 map tasks. Similarly, 64 partitions of intermediate results output by the map tasks can be processed by corresponding 64 reduce tasks. Since there are 64 map slots allocated to the map tasks, the execution of the given job can be completed in a single map wave.

As depicted in FIG. 3A, the 64 map tasks are performed in corresponding 64 map slots 302, in a single map wave (represented generally as 304). Similarly, the 64 reduce tasks are performed in corresponding 64 reduce slots 306, also in a single reduce wave 308, which includes shuffle, sort, and reduce phases represented by different line patterns in FIG. 3A.

A "map wave" refers to an iteration of the map stage. If the number of allocated map slots is greater than or equal to the number of map tasks, then the map stage can be completed in a single iteration (single wave). However, if the number of map slots allocated to the map stage is less than the number of map tasks, then the map stage would have to be completed in multiple iterations (multiple waves). Similarly, the number of iterations (waves) of the reduce stage is based on the number of allocated reduce slots as compared to the number of reduce tasks.

In a different example, if there are more than 64 map tasks (e.g. 71 map tasks), but there are still only 64 map slots, then the map stage would have to be performed in two map waves. The first map wave would process 64 map tasks, while the second map wave would process 7 map tasks. It is also assumed that there are 64 reduce tasks and 64 assigned reduce slots, such that the reduce stage can be performed in one reduce wave. The shuffle phase of the reduce stage can be completed only when all the map tasks are completed, and the shuffle phase can overlap with both map waves.

FIG. 3B illustrates a different allocation of map slots and reduce slots as compared to FIG. 3 A. Assuming the same given job (input data that is divided into 64 partitions), if the number of resources allocated is reduced to 16 map slots and 22 reduce slots, for example, then the completion time for the given job will change (increase). FIG. 3B illustrates execution of map tasks in the 16 map slots 310. In FIG. 3B, instead of performing the map tasks in a single wave as in FIG. 3A, the example of FIG. 3B illustrates four waves 312A, 312B, 312C, and 312D of map tasks. The reduce tasks are performed in the 22 reduce slots 314, in three waves 316A, 316B, and 316C. The completion time of the given job in the FIG. 3B example is greater than the completion time in the FIG. 3A example, since a smaller amount of resources was allocated to the given job in the FIG. 3B example than in the FIG. 3A example.

Thus, it can be observed from the examples of FIGS. 3A and 3B that the execution times of any given job can vary when different amounts of resources are allocated to the job.

Note also that while executions of the four map waves of FIG. 3B resemble each other, there can be a difference between the first reduce wave and the following two reduce waves. The shuffle phase of the first reduce wave starts immediately after the first map task completes. Moreover, this first shuffle phase continues until all the map tasks are complete, and the intermediate data is copied to the active reduce tasks. Thus, the first shuffle phase overlaps with the entire map stage. The sort phase of the reduce tasks occurs in parallel with a shuffle phase, but can complete only after their shuffle phase is completed. Finally, after the sort phase is done, the reduce phase can be performed. After that, the released reduce slots become available for the next phase of reduce tasks. As shown in FIG. 3B, there can be a relatively large difference between the execution time of the first reduce wave (316A) and the execution times of the subsequent reduce waves (316B and 316C).

Further details regarding the job profile, performance model, determination of solutions of resource allocations, and scheduling of job tasks are discussed below.

A job profile reflects performance invariants that are independent of the amount of resources assigned to the job over time, for each of the phases of the job: map, shuffle, sort, and reduce phases. The job profile characteristics for each of such phases are provided below.

The map stage includes a number of map tasks. To characterize the distribution of the map task durations and other invariant properties, the following metrics can be specified in some examples:

$(M_{min}, M_{avg}, M_{max}, AvgSize_M^{input}, Selectivity_M)$, where $M_{min}$ is the minimum map task duration. Since the shuffle phase starts when the first map task completes, $M_{min}$ is used as an estimate for the shuffle phase beginning.

$M_{avg}$ is the average duration of map tasks to indicate the average duration of a map wave.

$M_{max}$ is the maximum duration of a map task. Since the sort phase of the reduce stage can start only when the entire map stage is complete, i.e., all the map tasks complete, $M_{max}$ is used as an estimate for a worst map wave completion time.

$AvgSize_M^{input}$ is the average amount of input data for a map stage. This parameter is used to estimate the number of map tasks to be spawned for a new data set processing.

$Selectivity_M$ is the ratio of the map data output size to the map data input size. It is used to estimate the amount of intermediate data produced by the map stage as the input to the reduce stage (note that the size of the input data to the map stage is known).

As described earlier, the reduce stage includes the shuffle, sort and reduce phases. The shuffle phase begins only after the first map task has completed. The shuffle phase (of any reduce wave) completes when the entire map stage is complete and all the intermediate data generated by the map tasks have been provided to the reduce tasks and has been sorted.

In some implementations, the shuffle and sort phases are interwoven. As a result, the sort phase is included in the shuffle phase, and thus is not considered separately.

The reduce phase begins only after the shuffle/sort phase is complete. The profiles of the shuffle and reduce phases are represented by their average and maximum time durations. In addition, for the reduce phase, the reduce selectivity, denoted as $Selectivity_R$, is computed, which is defined as the ratio of the reduce data output size to its data input size.

As noted above, the shuffle phase of the first reduce wave may be different from the shuffle phase that belongs to the subsequent reduce waves (after the first reduce wave). This can happen because the shuffle phase of the first reduce wave overlaps with the map stage and depends on the number of map waves and their durations. Therefore, two sets of metrics are collected: $(Sh_{avg}^1, Sh_{max}^1)$ for average duration and maximum duration of a shuffle phase of the first reduce wave (referred to as the "first shuffle phase"), and $(Sh_{avg}^{typ}, Sh_{max}^{typ})$ for average duration and maximum duration of the shuffle phase of the subsequent reduce waves (referred to as "typical shuffle phase"). Since techniques according to some implementations are looking for the performance invariants that are independent of the amount of allocated resources to the job, a shuffle phase of the first reduce wave is characterized in a special way and the metrics ($Sh_{avg}^1$ and $Sh_{max}^1$) reflect only durations of the non-overlapping portions (non-overlapping with the map stage) of the first shuffle. In other words, the durations represented by $Sh_{avg}^1$ and $Sh_{max}^1$ represent portions of the duration of the shuffle phase of the first reduce wave that do not overlap with the map stage.

The job profile in the shuffle phase is characterized by two pairs of metrics relating to durations of the shuffle phase:

$(Sh_{avg}^1, Sh_{max}^1), (Sh_{avg}^{typ}, Sh_{max}^{typ})$.

The reduce phase begins only after the shuffle/sort phase is complete. The profile of the reduce phase is represented by the average and maximum of the reduce tasks durations ($R_{avg}$, $R_{max}$) and the reduce selectivity, denoted as $Selectivity_R$, which is defined as the ratio of the reduce data output size to its data input size:

$(R_{avg}, R_{max}, Selectivity_R)$.

The foregoing metrics (characteristics) relating to the map and reduce stages are part of a job profile. Based on such job profile, a performance model can be used to calculate a performance parameter of a job. In some implementations, the performance parameter can be expressed as an upper bound parameter or a lower bound parameter or some determined intermediate parameter between the lower bound and upper bound (e.g. average of the lower and upper bounds). In implementations where the performance parameter is a completion time value, the lower bound parameter is a lower bound completion time, the upper bound parameter is an upper bound completion time, and the intermediate performance parameter is an intermediate completion time (e.g. average completion time that is an average of the upper and lower completion). In other implementations, instead of calculating the average of the upper bound and lower bound to provide the intermediate performance parameter, a different intermediate parameter can be calculated, such as a value based on a weighted average of the lower and upper bounds or application of some other predefined function on the lower and upper bounds.

In some examples, the lower and upper bounds are for a makespan (a completion time of the job) of a given set of n (n>1) tasks that are processed by k (k>1) servers (or by k slots in a MapReduce environment). Let $T_1, T_2, \ldots, T_n$ be the respective durations of n tasks of a given job. Let k be the number of slots that can each execute one task at a time. The assignment of tasks to slots can be done using a simple, online, greedy algorithm, e.g. assign each task to the slot with the earliest finishing time.

Let $\mu = (\Sigma_{i=1}^n T_i)/n$ and $\lambda = \max_i \{T_i\}$ be the mean and maximum durations of the n tasks, respectively. The makespan of the greedy task assignment is at least $n \cdot \mu / k$ and at most $(n-1) \cdot \mu / k + \lambda$. The lower bound is trivial, as the best case is when all n tasks are equally distributed among the k slots (or the overall amount of work n·μ is processed as fast as it can by k slots). Thus, the overall makespan (completion time of the job) is at least n·μ/k (lower bound of the completion time).

For the upper bound of the completion time for the job, the worst case scenario is considered. i.e., the longest task $(\hat{T}) \in (T_1, T_2, \ldots, T_n)$ with duration λ is the last task processed. In this case, the time elapsed before the last task $(\hat{T})$ is scheduled is $(\Sigma_{i=1}^{n-1} T_i)/k \le (n-1) \cdot \mu/k$. Thus, the makespan of the overall assignment is at most $(n-1) \cdot \mu/k + \lambda$. These bounds are particularly useful when $\lambda \ll n \cdot \mu/k$, in other words, when the duration of the longest task is small as compared to the total makespan.

The difference between lower and upper bounds (of the completion time) represents the range of possible job completion times due to non-determinism and scheduling. As discussed below, these lower and upper bounds, which are part of the properties of the performance model, are used to estimate a completion time for a corresponding job J.

The given job J has a given profile created by the job profiler 120 or extracted from the profile database 122 (FIG. 1). Let J be executed with an input dataset that can be partitioned into $N_M^J$ map tasks and $N_R^J$ reduce tasks. Let $S_M^J$ and $S_R^J$ be the number of map slots and number of reduce slots, respectively, allocated to job J. The "J" superscript in a parameter indicates that the respective parameter is associated with job J.

Let $M_{avg}$ and $M_{max}$ be the average and maximum time durations of map tasks (defined by the job J profile). Then, based on the Makespan theorem, the lower and upper bounds on the duration of the entire map stage (denoted as $T_M^{low}$ and $T_M^{up}$, respectively) are estimated as follows:

$$T_M^{low} = N_M^J / S_M^J \cdot M_{avg}, \quad \text{(Eq. 1)}$$

$$T_M^{up} = (N_M^J - 1)/S_M^J \cdot M_{avg} + M_{max}, \quad \text{(Eq. 2)}$$

Stated differently, the lower bound of the duration of the entire map stage is based on a product of the average duration ($M_{avg}$) of map tasks multiplied by the ratio of the number of map tasks ($N_M^J$) to the number of allocated map slots ($S_M^J$). The upper bound of the duration of the entire map stage is based on a sum of the maximum duration of map tasks ($M_{max}$) and the product of $M_{avg}$ with $(N_M^J - 1)/S_M^J$. Thus, it can be seen that the lower and upper bounds of durations of the map stage are based on characteristics of the job J profile relating to the map stage, and based on the allocated number of map slots.

Similar to the computation of the lower and upper bounds of the map stage, the lower and upper bounds of time durations for each of the shuffle phase ($T_{Sh}^{low}, T_{Sh}^{up}$), and reduce phase ($T_R^{low}, T_R^{up}$) are computed (it is assumed that the sort phase is interleaved with the shuffle phase and thus the sort phase is considered as part of the shuffle phase). The computation of the Makespan theorem is based on the average and maximum durations of the tasks in these phases (respective values of the average and maximum time durations of the shuffle phase, and the average and maximum time duration of the reduce phase) and the numbers of reduce tasks $N_R$ and allocated reduce slots $S_R$, respectively. The formulae for calculating ($T_{Sh}^{low}, T_{Sh}^{up}$) and ($T_R^{low}, T_R^{up}$) are similar to the formulae for calculating $T_M^{up}$ and $T_M^{up}$ set forth above, except variables associated with the reduce tasks and reduce slots and the respective phases of the reduce stage are used instead.

The subtlety lies in estimating the duration of the shuffle phase. As noted above, the first shuffle phase is distinguished from the task durations in the typical shuffle phase (which is a shuffle phase subsequent to the first shuffle phase). As noted above, the first shuffle phase includes measurements of a portion of the first shuffle phase that does not overlap the map stage. The portion of the typical shuffle phase in the subsequent reduce waves (after the first reduce wave) is computed as follows:

$$T_{Sh}^{low} = \left(\frac{N_R^J}{S_R^J} - 1\right) \cdot Sh_{avg}^{typ}, \quad \text{(Eq. 3)}$$

$$T_{Sh}^{up} = \left(\frac{N_R^J - 1}{S_R^J} - 1\right) \cdot Sh_{avg}^{typ} + Sh_{max}^{typ}, \quad \text{(Eq. 4)}$$

where $Sh_{avg}^{typ}$ is the average duration of a typical shuffle phase, and $Sh_{max}^{typ}$ is the maximum duration of the typical shuffle phase. The formulae for the lower and upper bounds of the overall completion time of job J are as follows:

$$T_J^{low} = T_M^{low} + Sh_{avg}^1 + T_{Sh}^{low} + T_R^{low}, \quad \text{(Eq. 5)}$$

$$T_J^{up} = T_M^{up} + Sh_{max}^1 + T_{Sh}^{up} + T_R^{up}, \quad \text{(Eq. 6)}$$

where $Sh_{avg}^1$ is the average duration of the first shuffle phase, and $Sh_{max}^1$ is the maximum duration of the first shuffle phase. $T_J^{low}$ and $T_J^{up}$ represent optimistic and pessimistic predictions (lower and upper bounds) of the job J completion time. Thus, it can be seen that the lower and upper bounds of time durations of the job J are based on characteristics of the job J profile and based on the allocated numbers of map and reduce slots. The performance model, which includes $T_J^{low}$ and $T_J^{up}$ in some implementations, is thus based on both the job profile as well as allocated numbers of map and reduce slots.

In some implementations, instead of using the lower and upper bounds, an intermediate performance parameter value can be used, such as an average value $T_J^{avg}$ between the lower and upper bounds:

$$T_J^{avg} = (T_M^{up}) + T_J^{low}/2. \quad \text{(Eq. 7)}$$

Eq. 5 for $T_J^{low}$ can be rewritten by replacing its parts with Eq. 1 and Eq. 3 and similar equations for sort and reduce phases as follows:

$$T_J^{low} = \frac{N_M^J \cdot M_{avg}}{S_M^J} + \frac{N_M^J \cdot (Sh_{avg}^{typ} + R_{avg})}{S_R^J} + Sh_{avg}^1 - Sh_{avg}^{typ}, \quad \text{(Eq. 8)}$$

The alternative presentation of Eq. 8 allows the estimates for completion time to be expressed in a simplified form shown below:

$$T_J^{low} = A_J^{low} \cdot \frac{N_M^J}{S_M^J} + B_J^{low} \cdot \frac{N_R^J}{S_R^J} + C_J^{low}, \quad \text{(Eq. 9)}$$

where $A_J^{low} = M_{avg}$, $B_J^{low} = (Sh_{avg}^{typ} + R_{avg})$, and $C_J^{low} = Sh_{avg}^1 - Sh_{avg}^{typ}$. Eq. 9 provides an explicit expression of a job completion time as a function of map and reduce slots allocated to job J for processing its map and reduce tasks, i.e., as a function of $(N_M^J, N_R^J)$ and $(S_M^J, S_R^J)$. The equations for $T_J^{up}$ and $T_J^{avg}$ can be rewritten similarly.

The foregoing explains how a performance model uses a job profile can be derived and used for predicting a performance parameter (e.g. job completion time) when different amounts of resources (different allocations of slots) are used.

In the presence of failure, some of the properties of the performance model discussed above can change, thereby affecting the estimated performance parameter produced using the performance model. As discussed above, when a failure occurs on a slave node while a job was running, then either completed or in-progress map tasks on the failed slave node may have to be recomputed, since the intermediate data of these tasks may be unavailable to current or future reduce tasks. The same applies to reduce tasks that were in progress on the failed slave node—such reduce tasks may have to be restarted on a different slave node.

As noted above, failure of a slave node during the map stage means that the map tasks of the failed slave node are considered failed and would have to be restarted; however, failure of a slave node during the map stage means that there has not been any failed reduce tasks. On the other hand, if failure of a slave node occurred during the map stage, then all completed map tasks on the failed slave node would have to be recomputed, as well as reduce tasks that were in-progress on the failed slave node. The latency associated with failure during the reduce stage can be significant, since failure of a slave node during the reduce stage can add a latency equal to an entire map and reduce stage latency: $M_{max} + Sh_{max}^{typ} + R_{max}$.

Given a time of failure $t_f$, the system attempts to quantify the job completion time bounds. In some implementations, the time of failure $t_f$ is measured as a relative time from the start of a job. Assuming a job J with a given profile, which is partitioned into $N_M^J$ map tasks and $N_R^J$ reduce tasks, let the slave node failure occur at some point of time $t_f$. There are two possibilities for the job J execution status at the time of failure—it is either in the map or the reduce stage. The system can predict whether the failure happened during the map or reduce stage based on either using lower or upper bounds of a completion time (or its average).

The following considers an example where the computation is based on the lower bound. In alternative examples, the computation is based on upper or average bounds. The following describes how to approximate the number of map and reduce tasks yet to be completed in the two possible cases.

In the first case, it is assumed that the job execution is in the map stage at time $t_f$, i.e. $t_f \leq T_M^{low}$. In order to determine the number of map tasks yet to be processed, the number of completed ($N_{M\,done}^J$) and failed ($N_{M\,fail}^J$) map tasks are approximated as follows:

$$N_{M\,done}^J \cdot M_{avg}/S_M^J = t_f \Rightarrow N_{M\,done}^J = \lfloor t_f S_M^J/M_{avg} \rfloor. \quad \text{(Eq. 10)}$$

In Eq. 10, the result is rounded down to the closest integer. If there are W slave nodes in the cluster for job J processing and one of them fails, then the number of failed map tasks is estimated as:

$$N_{M\,fail}^J = \lfloor N_{M\,done}^J/W \rfloor. \quad \text{(Eq. 11)}$$

In Eq. 11, the result is rounded down to the closest integer. Thus, the number of map and reduce tasks yet to be processed at time $t_f$ (denoted as $N_{M,tf}^J$ and $N_{R,tf}^J$) are determined as follows:

$$N_{M,tf}^J = N_M^J - N_{M\,done}^J + N_{M\,fail}^J \text{ and } N_{R,tf}^J = N_R^J. \quad \text{(Eq. 12)}$$

According to Eq. 12, the number of reduce tasks to be processed ($N_{R,tf}^J$) includes all reduce tasks of the reduce stage, since the reduce stage has not yet started at the time of failure. The number of map tasks to be processed ($N_{M,tf}^J$) includes the number of map tasks of the map stage, less the number of completed map tasks, plus the number of failed map tasks.

In a second case, it is assumed that the map stage is complete, and the job execution is in the reduce stage at time $t_f$, $t_f \geq T_M^{low}$ and all the map tasks $N_M^J$ are completed. The number of completed reduce tasks $N_{R\,done}^J$ at time $t_f$ can be evaluated using Eq. 13:

$$B_J^{low} \cdot \frac{N_{R\,done}^J}{S_R^J} = t_f - C_J^{low} - A_J^{low} \cdot \frac{N_M^J}{S_M^J}. \quad \text{(Eq. 13)}$$

Then the number of failed map and reduce tasks can be approximated as:

$$N_{M\,fail}^J = \lfloor N_M^J/W \rfloor \text{ and } N_{R\,fail}^J = \lfloor N_{R\,done}^J/W \rfloor. \quad \text{(Eq. 14)}$$

According to Eq. 14, the number of failed map tasks includes all the map tasks completed during the map stage on the failed slave node. The number of failed reduce tasks includes the number of completed reduce tasks on the failed slave node.

Thus, the remaining map and reduce tasks of job J yet to be processed at time $t_f$ are determined as follows:

$$N_{M,tf}^J = N_{M\,fail}^J \text{ and } N_{R,tf}^J = N_R^J - N_{R\,done}^J + N_{R\,fail}^J. \quad \text{(Eq. 15)}$$

Let $S_{M,tf}^J$ and $S_{R,tf}^J$ be the number of map and reduce slots allocated to job J after the node failure. If the failed resources are not replenished, then the number of map and reduce slots is correspondingly decreased from the initial allocation of map and reduce slots ($S_M^J, S_R^J$). The number of map and reduce tasks yet to be processed are $N_{M,tf}^J$ and $N_{R,tf}^J$ as shown above. Then the performance bounds on the processing time of these tasks can be computed using Eq. 5 and Eq. 6 (or Eq. 7).

In some implementations, the slave node failure is detected only after time $\delta$ depending on the value of a heart beat interval (time interval between heartbeats sent by slave nodes). Failure to receive (at the master node) a heartbeat message from a slave node indicates to the master node that the slave node has failed. Hence, the time bounds calculated using Eqs. 5-7 are also increased by the additional time delay $\delta$.

Figure 4:
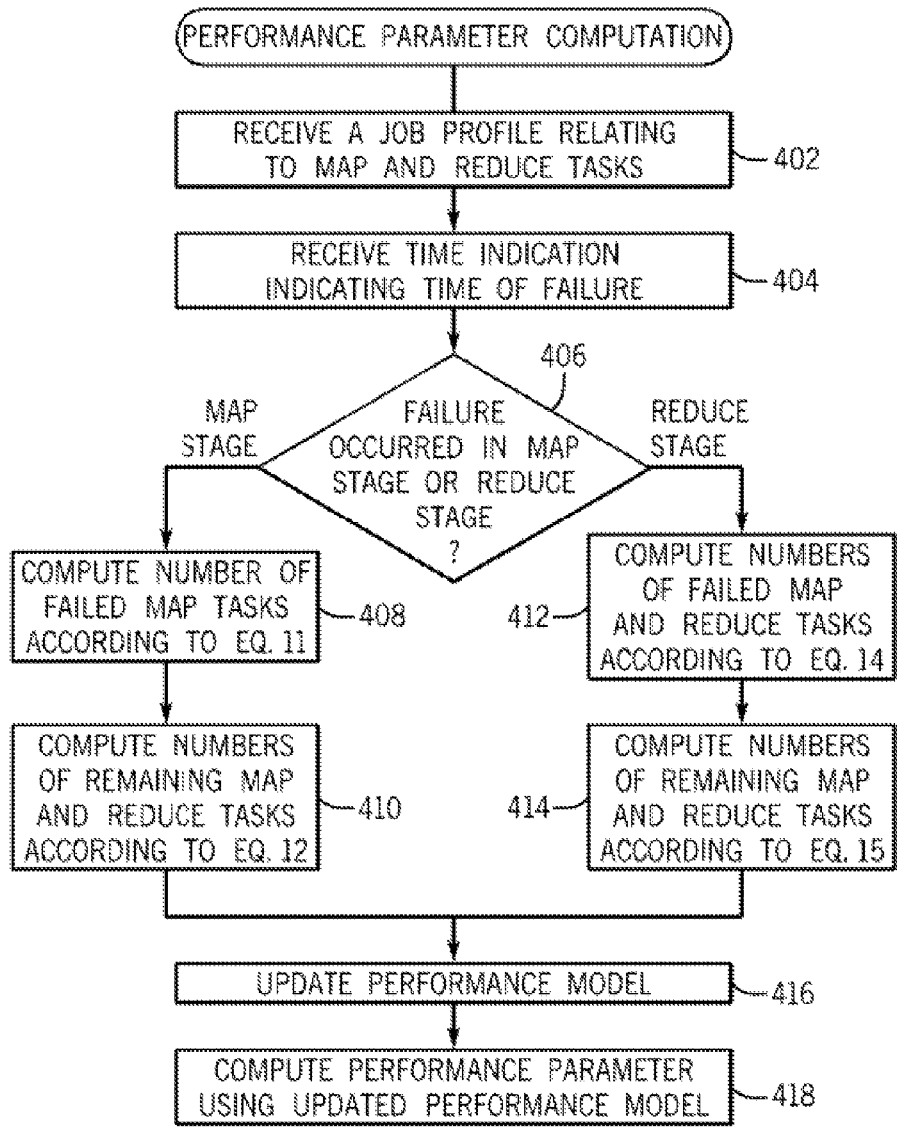
FIG. 4 is a flow diagram of a process of determining a performance parameter according to alternative implementations.

FIG. 4 is a flow diagram of a process according to further implementations, which can be performed by the scheduler 108 of FIG. 1, for example. The process of FIG. 4 receives (at 402) a job profile that includes characteristics of a job to be executed, such as a job profile discussed above. The process then receives (at 404) a time indication that specifies a time of failure ($t_f$). Based on the time of failure ($t_f$), the process determines (at 406) whether the failure occurred in the map stage or the reduce stage. If the failure occurred in the map stage, then the process computes (at 408) the number of failed map tasks according to Eq. 11, and sets the number of failed reduce tasks to zero. From the number of failed reduce tasks, the process can determine (at 410) the number of remaining map tasks to be processed (according to Eq. 12). The process also determines (at 410) the number of reduce tasks to be processed (according to Eq. 12).

The parameters $N_{M,tf}^J$ and $N_{R,tf}^J$ computed according to Eq. 12 are then used to update (at 416) the performance model, and the updated performance model is used for computing (at 418) the performance parameter for the job.

On the other hand, if it is determined (at 406) that the failure occurred during the reduce stage, then the number of failed reduce tasks and the number of failed map tasks are computed (at 412) according to Eq. 14. Based on the numbers of failed map and reduce tasks, the remaining numbers of map and reduce tasks of job J ($N_{M,tf}^J$ and $N_{R,tf}^J$) are computed (at 414) according to Eq. 15. These parameters, $N_{M,tf}^J$ and $N_{R,tf}^J$, are used to update (at 416) the performance model, and an updated performance parameter is computed (at 418) using the updated performance model.

Machine-readable instructions described above (including various modules of FIG. 1) are executed on a processor or multiple processors (such as 124 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    receiving, by a system comprising a processor, a job profile that includes characteristics of a job to be executed, wherein the characteristics of the job profile relate to map tasks and reduce tasks of the job, wherein the map tasks produce intermediate results based on input data, and the reduce tasks produce an output based on the intermediate results;
    in response to an indication of a failure in the system associated with execution of the job, computing, by the system, numbers of failed map tasks and failed reduce tasks of the job based on a time of the failure, wherein the indication of the failure comprises an indication that a computing node of plural computing nodes has failed;
    computing, by the system, numbers of remaining map tasks and remaining reduce tasks based on the numbers of failed map tasks and failed reduce tasks;
    providing, by the system, a performance model based on the job profile, the computed numbers of remaining map tasks and remaining reduce tasks, and an allocated amount of resources for the job, wherein providing the performance model is based on the allocated amount of resources that has been reduced from a previous allocation of resources due to the failure; and
    estimating, by the system, a performance parameter of the job using the performance model.

2. The method of claim 1, wherein the indication comprises a time indication regarding the time of the failure.

3. The method of claim 2, further comprising:
    based on the time of failure, determining whether the failure is during a map stage or reduce stage, where the map tasks of the job are performed during the map stage, and wherein the reduce tasks of the job are performed in the reduce stage.

4. The method of claim 3, wherein, based on the failure occurring during the map stage, the computed number of failed reduce tasks is zero.

5. The method of claim 3, wherein, based on the failure occurring during the reduce stage, the computed number of failed map tasks is equal to a number of the map tasks of the job in the map stage divided by a number of worker nodes for executing map and reduce tasks.

6. The method of claim 1, wherein estimating the performance parameter comprises estimating a time duration of the job.

7. An article comprising at least one non-transitory machine-readable storage medium storing instructions that upon execution cause a system to:
    receive a job profile that includes characteristics of a job to be executed, wherein the characteristics of the job profile relate to map tasks and reduce tasks of the job, wherein the map tasks produce intermediate results based on input data, and the reduce tasks produce an output based on the intermediate results;
    in response to an indication of a failure in the system associated with execution of the job, compute numbers of failed map tasks and failed reduce tasks of the job based on a time of the failure;
    compute numbers of remaining map tasks and remaining reduce tasks based on the numbers of failed map tasks and failed reduce tasks;
    determine whether resources of the system are to be replenished after the failure;
    provide a performance model based on the job profile, the computed numbers of remaining map tasks and remaining reduce tasks, and an allocated amount of resources for the job, wherein providing the performance model is based on the allocated amount of resources after the replenishing of resources; and
    estimate a performance parameter of the job using the performance model.

8. The article of claim 7, wherein the indication of the failure comprises an indication that a computing node of plural computing nodes has failed.

9. The article of claim 7, wherein the indication comprises a time indication regarding the time of the failure.

10. The article of claim 7, wherein estimating the performance parameter comprises estimating a time duration of the job.

11. A system comprising:
    a storage medium to store a job profile that includes characteristics of a job to be executed, wherein the characteristics of the job profile relate to map tasks and reduce tasks of the job, wherein the map tasks produce intermediate results based on input data, and the reduce tasks produce an output based on the intermediate results; and
    at least one processor to:
        detect occurrence of a failure in the system;
        in response to detecting the failure, determine whether the failure occurred during a map stage or a reduce stage, wherein the map tasks are to be performed during the map stage, and the reduce tasks are to be performed during the reduce stage;

compute a number of failed map tasks and a number of failed reduce tasks dependent upon whether the failure occurred during the map stage or the reduce stage;

compute a number of remaining map tasks and a number of remaining reduce tasks based on the numbers of failed map tasks and failed reduce tasks;

update a performance model using the numbers of remaining map tasks and remaining reduce tasks; and estimate a performance parameter of the job using the updated performance model.

12. The system of claim 11, wherein the at least one processor is to further: receive an indication of a time of the failure, wherein determining whether the failure occurred during the map stage or the reduce stage is based on comparing the time of the failure with a time bound associated with the map stage.

13. The system of claim 11, wherein the at least one processor is to maintain, in the performance model, an allocation of resources equal to an initial allocation of resources for the job in response to an indication that failed resources are to be replenished.

14. The system of claim 11, wherein the performance parameter is a time duration of the job.

15. A system comprising:

a storage medium to store a job profile that includes characteristics of a job to be executed, wherein the characteristics of the job profile relate to map tasks and reduce tasks of the job, wherein the map tasks produce intermediate results based on input data, and the reduce tasks produce an output based on the intermediate results; and at least one processor to:

detect occurrence of a failure in the system;

in response to detecting the failure, compute a number of failed map tasks and a number of failed reduce tasks based on a time of the failure;

compute a number of remaining map tasks and a number of remaining reduce tasks based on the numbers of failed map tasks and failed reduce tasks;

update a performance model using the numbers of remaining map tasks and remaining reduce tasks and in response to an indication that failed resources are not to be replenished, wherein the update of the performance model includes reducing allocations of resources; and estimate a performance parameter of the job using the updated performance model.

16. The system of claim 15, wherein the performance parameter is a time duration of the job.

* * * * *